United States Patent
Kuroda (10) Patent No.: US 11,199,694 B2
(45) Date of Patent: Dec. 14, 2021

(54) PROJECTION APPARATUS

(71) Applicant: FUJIFILM Corporation, Tokyo (JP)

(72) Inventor: Yasuto Kuroda, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/143,751

(22) Filed: Jan. 7, 2021

(65) Prior Publication Data

US 2021/0124164 A1 Apr. 29, 2021

Related U.S. Application Data (63) Continuation of application No. PCT/JP2019/021376, filed on May 29, 2019.

(30) Foreign Application Priority Data

Jul. 25, 2018 (JP) .............................. JP2018-139788

(51) Int. Cl.
*G03B 21/14* (2006.01)
*G02B 26/08* (2006.01)
(Continued)

(52) U.S. Cl.
CPC ....... *G02B 26/0833* (2013.01); *G03B 21/008* (2013.01); *G03B 21/142* (2013.01); *G03B 21/2033* (2013.01); *G03B 21/2066* (2013.01)

(58) Field of Classification Search
CPC . G03B 26/0833; G03B 21/14; G03B 21/2033
(Continued)

(56) References Cited

U.S. PATENT DOCUMENTS

2002/0067426 A1 6/2002 Nagata et al.
2007/0195294 A1 8/2007 Willey et al.
(Continued)

FOREIGN PATENT DOCUMENTS

JP 11-205641 A 7/1999
JP 2004-198868 A 7/2004
(Continued)

OTHER PUBLICATIONS

International Preliminary Report on Patentability and the Written Opinion of the International Searching Authority (Forms PCT/IB/326, PCT/IB/373 and PCT/ISA/237) for corresponding International Application No. PCT/JP2019/021376, dated Feb. 4, 2021, with an English translation of the Written Opinion.
(Continued)

*Primary Examiner* — William C. Dowling
(74) *Attorney, Agent, or Firm* — Birch, Stewart, Kolasch & Birch, LLP (57) ABSTRACT

A projection apparatus includes: a fixed body that contains a light source and a light modulation element for spatially modulating light from the light source based on image data; a movable body that includes a reflecting member for reflecting light emitted from the fixed body, is rotatably supported by the fixed body around a rotation axis parallel to an incidence direction of the light onto the reflecting member, and is movable with respect to the fixed body; a fixed body side electrode; a movable body side electrode; a driving unit; and an optical member that is provided at the movable body and driven by the driving unit, and the fixed body includes a driving controller that controls the driving unit in a case where the movable body side electrode is electrically conducted with the fixed body side electrode.

20 Claims, 8 Drawing Sheets

(51) Int. Cl.
 *G03B 21/00* (2006.01)
 *G03B 21/20* (2006.01)
(58) Field of Classification Search
 USPC .......................................................... 353/119
 See application file for complete search history.

(56) References Cited

U.S. PATENT DOCUMENTS

| | | |
|---|---|---|
| 2008/0111976 A1 | 5/2008 | Takito et al. |
| 2019/0218816 A1* | 7/2019 | Kumerz Gonzalez ....................... E04H 17/165 |
| 2019/0219915 A1* | 7/2019 | Kayano .................. G03B 21/14 |
| 2020/0299240 A1* | 9/2020 | Zhai ...................... C07D 213/81 |
| 2021/0148291 A1* | 5/2021 | Yamamoto ................ F02C 9/46 |

FOREIGN PATENT DOCUMENTS

| | | |
|---|---|---|
| JP | 2006-80875 A | 3/2006 |
| JP | 2006-276446 A | 10/2006 |
| JP | 2010-288307 A | 12/2010 |
| JP | 2012-98506 A | 5/2012 |
| JP | 2313-37782 A | 2/2013 |
| JP | 2014-170097 A | 9/2014 |

OTHER PUBLICATIONS

International Search Report (Form PCT/ISA/210) for corresponding International Application No. PCT/JP2019/021376, dated Jul. 16, 2019, with English translation.

* cited by examiner

PROJECTION APPARATUS

CROSS REFERENCE TO RELATED APPLICATION

This is a continuation of International Application No. PCT/JP2019/021376 filed on May 29, 2019, and claims priority from Japanese Patent Application No. 2018-139788 filed on Jul. 25, 2018, the entire disclosures of which are incorporated herein by reference.

BACKGROUND OF THE INVENTION

1. Field of the Invention

The present invention relates to a projection apparatus.

2. Description of the Related Art

JP2012-098506A discloses a projection apparatus in which an optical part for accommodating a projection optical system including a reflecting member is provided so as to protrude from a housing, and a projection direction can be changed in a plane horizontal to an installation surface by rotating a portion of the optical part containing the reflecting member.

JP2014-170097A discloses a projection apparatus in which a reflecting member is provided so as to protrude from a housing, and a projection direction can be changed in a plane horizontal to an installation surface by changing a reflection direction of light by the reflecting member.

In the projection apparatuses disclosed in JP2012-098506A and JP2014-170097A, a projection image is not rotated by the change in the projection direction by adjusting an orientation of the projection image projected on the projection surface according to an orientation of the reflecting member.

JP2004-198868A discloses a projection apparatus in which a main body case for accommodating a light source and a projection optical system is rotatably attached to an arm portion around a support axis of the arm portion. The projection apparatus detects a rotation angle of the main body case depending on which of a plurality of switch patterns formed on a substrate a contact point fixed to the support axis is in contact with, and performs trapezoidal distortion correction of the projection image according to the rotation angle.

JP2010-288307A discloses a digital camera capable of rotatably connecting a camera main body and a lens unit.

SUMMARY OF THE INVENTION

In an apparatus capable of rotating a part of a projection optical system such as the projection apparatus disclosed in JP2012-098506A and JP2014-170097A, for example, it is assumed that an optical member (for example, a lens for focus adjustment, a lens for focal length adjustment, a variable stop, or the like) driven by an electrical conduction is included in a movable body. In this case, it is necessary to electrically connect the movable body and a main body unit in which a control apparatus for performing the electrical conduction control is accommodated. However, in a configuration in which the movable body and the main body unit are connected by wiring, the wiring may be damaged due to frequent rotation of the movable body. In addition, a design that can withstand the rotation of the movable body is required, which increases a manufacturing cost of the apparatus.

JP2012-098506A and JP2014-170097A do not consider electrically conducting the movable body, and do not recognize the above-described problems. The projection apparatus disclosed in JP2004-198868A does not electrically conduct between the movable main body case and the arm portion that supports the movable main body case, and does not recognize the above-described problem.

In addition, as described in JP2012-098506A and JP2014-170097A, it is necessary to detect a rotational position of the movable body in order to perform control such that the orientation of the projection image does not change according to the projection direction. In JP2012-098506A, JP2014-170097A, and JP2004-198868A, since a sensor for detecting the rotational position of the movable body is provided exclusively, the manufacturing cost of the apparatus increases. In JP2010-288307A, a rotation angle of the lens unit with respect to the camera main body is detected by units using a hall element or a pin. Therefore, the cost for detecting the rotational position increases.

The present invention has been made in view of the above circumstances, and an object thereof is to provide a projection apparatus capable of maintaining the electrical connection with a movable body even in a case where the movable body is rotated repeatedly to change the projection direction, and capable of detecting the rotational position of the movable body and adjusting the projection image according to the projection direction without adding a dedicated sensor.

The projection apparatus according to the embodiment of the present invention is a projection apparatus comprising a fixed body that contains a light source and a light modulation element for spatially modulating light from the light source on the basis of image data, a movable body that includes a reflecting member for reflecting light emitted from the fixed body, is rotatably supported by the fixed body around a rotation axis parallel to an incidence direction of the light on the reflecting member, and is movable with respect to the fixed body, a fixed body side electrode that is formed in a portion of the fixed body in contact with the movable body, a movable body side electrode that is formed in a portion of the movable body in contact with the fixed body, a driving unit that is provided at the movable body and electrically connected to the movable body side electrode, and an optical member that is provided at the movable body and driven by the driving unit, in which the fixed body includes a driving controller that controls the driving unit in a case where the movable body side electrode is electrically conducted with the fixed body side electrode.

According to the present invention, it is possible to provide a projection apparatus capable of maintaining the electrical connection with a movable body even in a case where the movable body is rotated repeatedly to change the projection direction, and capable of detecting the rotational position of the movable body and adjusting the projection image according to the projection direction without adding a dedicated sensor.

DESCRIPTION OF THE PREFERRED EMBODIMENTS

Hereinafter, embodiments of the present invention will be described with reference to the drawings.

Figure 1:
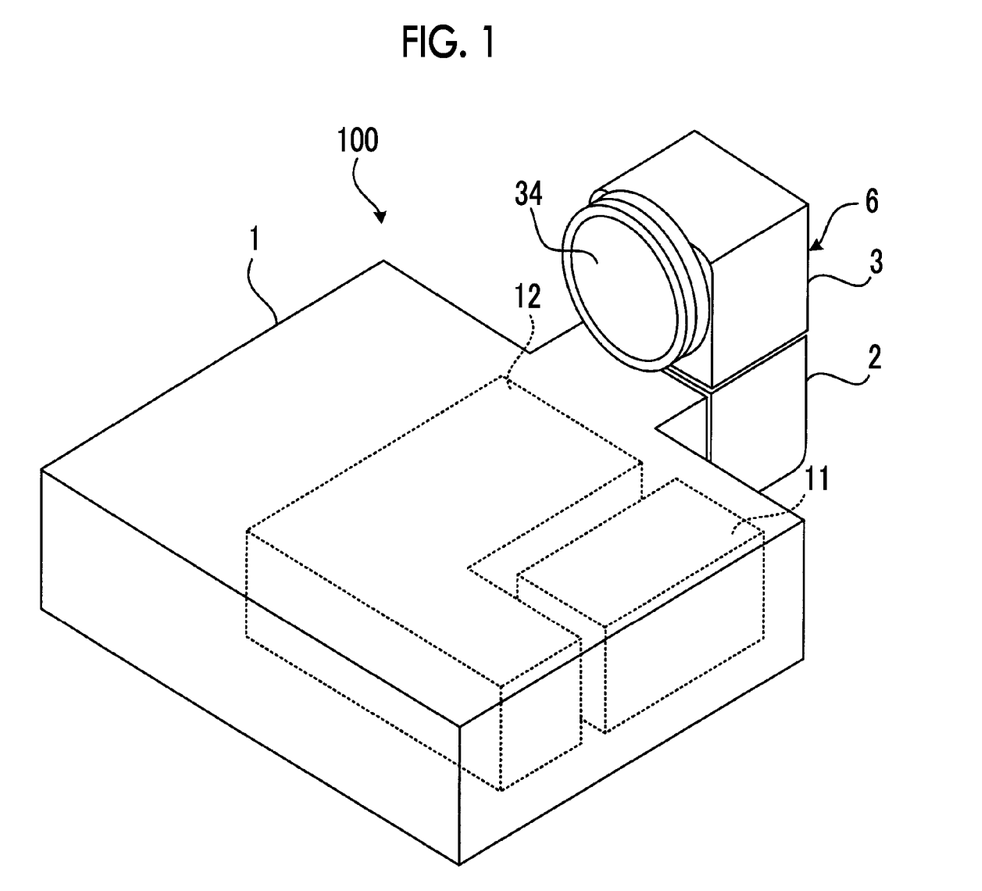
FIG. 1 is a schematic view showing an external configuration of a projector 100, which is an embodiment of a projection apparatus according to the embodiment of the present invention.
Figure 2:
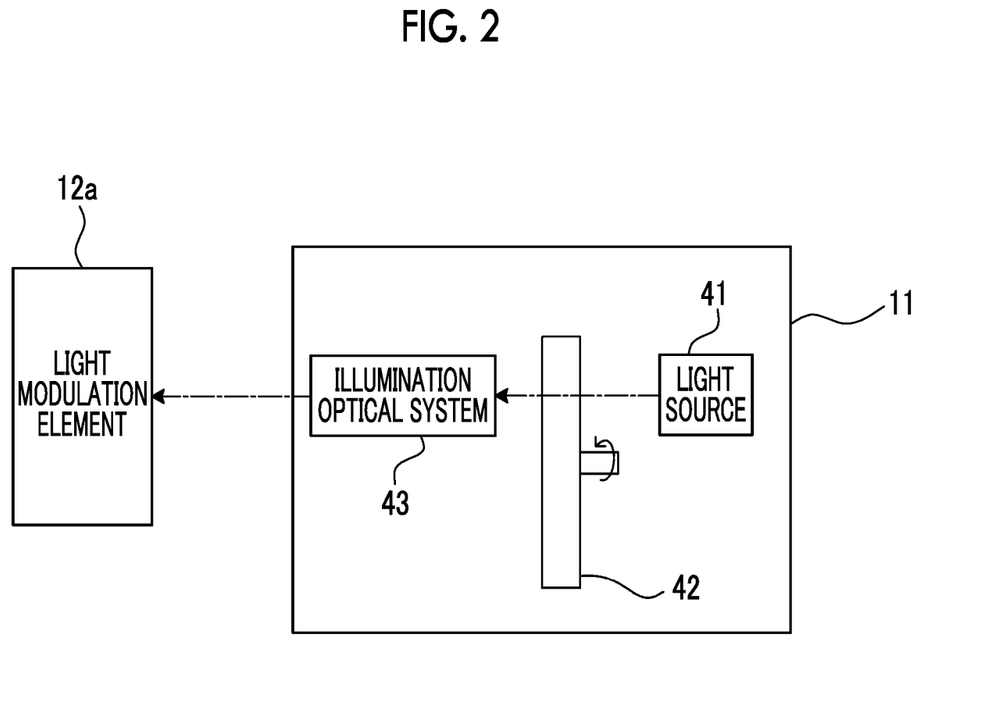
FIG. 2 is a schematic view showing an example of an internal configuration of a light source unit 11 of FIG. 1.
Figure 3:
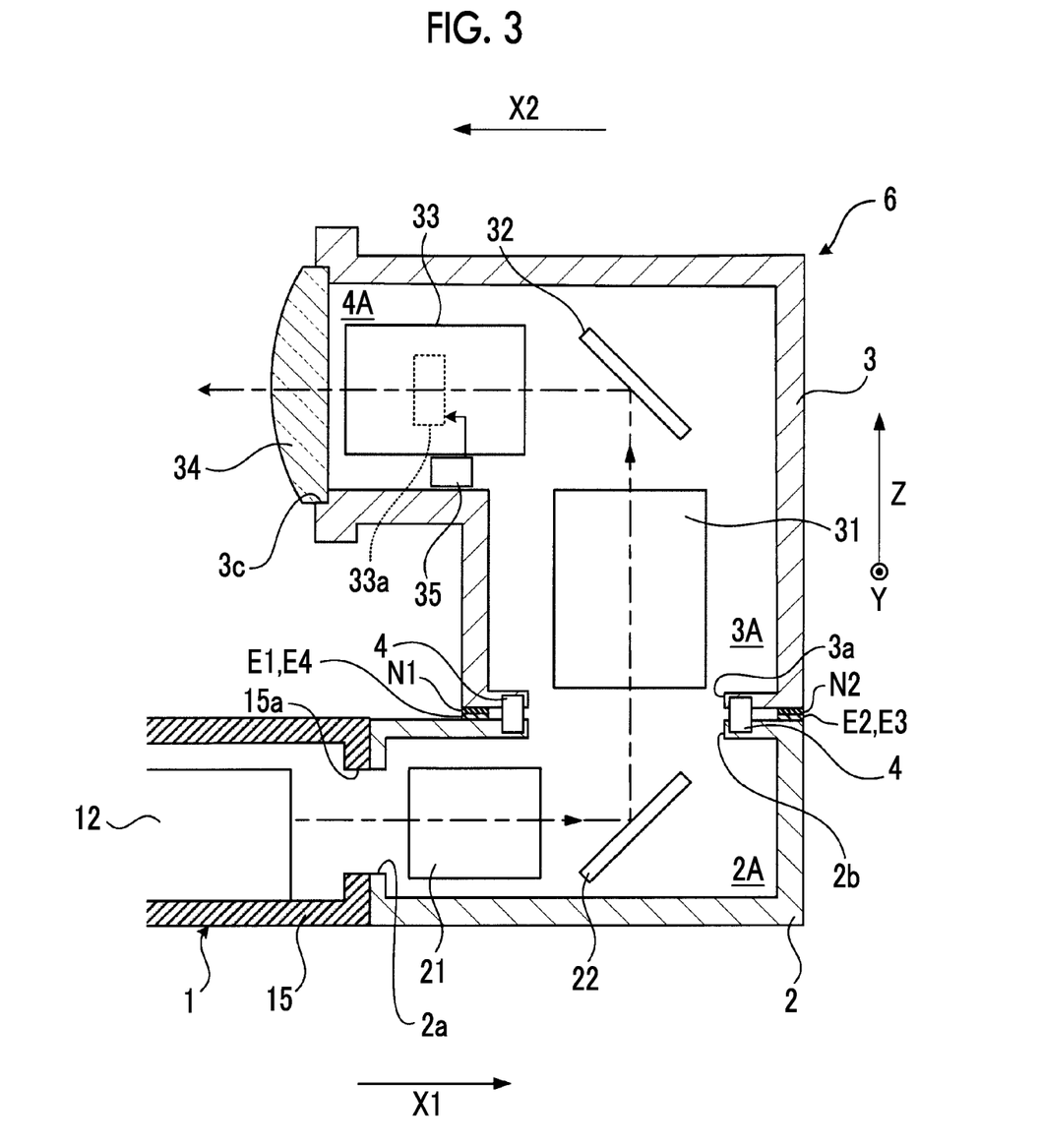
FIG. 3 is a schematic cross-sectional view of an optical unit 6 of the projector 100 shown in FIG. 1.

FIG. 1 is a schematic view showing an external configuration of a projector 100, which is an embodiment of a projection apparatus according to the embodiment of the present invention. FIG. 2 is a schematic view showing an example of an internal configuration of a light source unit 11 of FIG. 1. FIG. 3 is a schematic cross-sectional view of an optical unit 6 of the projector 100 shown in FIG. 1. FIG. 3 shows a cross section taken along an optical path of light emitted from a main body unit 1.

As shown in FIG. 1, the projector 100 comprises a main body unit 1 and an optical unit 6 provided so as to protrude from the main body unit 1.

The main body unit 1 has a housing 15 (refer to FIG. 3) in which an aperture 15a (refer to FIG. 3) for passing light is formed in a portion connected to the optical unit 6.

As shown in FIG. 1, a light source unit 11 and a light modulation unit 12 including a light modulation element 12a (refer to FIG. 2) which spatially modulates light emitted from the light source unit 11 on the basis of image data are provided in the housing 15 of the main body unit 1.

In the example shown in FIG. 2, the light source unit 11 comprises a light source 41 that emits white light, a color wheel 42, and an illumination optical system 43. The light source 41 is configured to include a light emitting element such as a laser or a light emitting diode (LED). The color wheel 42 is arranged between the light source 41 and the illumination optical system 43. The color wheel 42 is a disk-shaped member, and an R filter that transmits red light, a G filter that transmits green light, and a B filter that transmits blue light are provided along a circumferential direction thereof. The color wheel 42 is rotated around the axis to divide white light emitted from the light source 41 into red light, green light, and blue light in time division and guide them to the illumination optical system 43. The light emitted from the illumination optical system 43 is incident on the light modulation element 12a.

As the light modulation element 12a included in the light modulation unit 12, a digital micromirror device (DMD) is used, for example, in the case of the configuration of the light source unit 11 of FIG. 2. As the light modulation element 12a, a liquid crystal on silicon (LCOS) element, a micro electro mechanical systems (MEMS) element, a liquid crystal display element, or the like can also be used. The light spatially modulated by the light modulation unit 12 passes through the aperture 15a of the housing 15 and is incident on the optical unit 6.

As shown in FIG. 3, the optical unit 6 comprises a first member 2 having a hollow portion 2A that is connected to an interior of the main body unit 1, a second member 3 having a hollow portion 3A that is connected to the hollow portion 2A, a first optical system 21 and a reflecting member 22 that are arranged in the hollow portion 2A, a second optical system 31, a reflecting member 32, a third optical system 33, a driving unit 35, a lens 34 that are arranged in the hollow portion 3A, and a rotation mechanism 4.

The first member 2 is a member having a rectangular cross-sectional outer shape, and an aperture 2a and an aperture 2b are formed on surfaces perpendicular to each other. The first member 2 is supported by the main body unit 1 in a state where the aperture 2a is arranged at a position facing the aperture 15a of the main body unit 1. The light emitted from the light modulation unit 12 of the main body unit 1 passes through the aperture 15a and the aperture 2a and is incident on the hollow portion 2A of the first member 2. The incidence direction of the light incident on the hollow portion 2A from the main body unit 1 is defined as a direction X1.

The reflecting member 22 arranged in the hollow portion 2A of the first member 2 reflects the light incident from the main body unit 1 in a direction Z which is a direction perpendicular to the direction X1. The reflecting member 22 is composed of, for example, a half mirror, a beam splitter, a polarizing member, or the like.

The first optical system 21 arranged in the hollow portion 2A of the first member 2 is arranged between the reflecting member 22 and the main body unit 1, and includes at least one lens.

Light proceeding in the direction X1 made incident from the main body unit 1 to the first member 2 passes through the first optical system 21, is reflected by the reflecting member 22, and proceeds to the direction Z. The first member 2 has an aperture 2b formed on the optical path of the light reflected by the reflecting member 22, and the reflected light passes through the aperture 2b and proceeds to the hollow portion 3A of the second member 3. The projector 100 is installed and used such that the direction Z faces the opposite direction in the vertical direction.

The rotation mechanism 4 is a mechanism for rotatably connecting the second member 3 to the first member 2. By this rotation mechanism 4, the second member 3 is rotatably configured around a rotation axis parallel to the direction Z (specifically, an axis extending in the direction Z passing through a center of the aperture 2b).

The second member 3 is a member having a substantially L-shaped cross-sectional outer shape, and an aperture 3a is formed at a position facing the aperture 2b of the first member 2. The light from the main body unit 1 that has passed through the aperture 2b of the first member 2 is incident on the hollow portion 3A of the second member 3 through the aperture 3a.

The reflecting member 32 arranged in the hollow portion 3A of the second member 3 reflects the light incident from the first member 2 in the direction X2 which is the direction perpendicular to the direction Z. The reflecting member 32 is composed of, for example, a half mirror, a beam splitter, a polarizing member, or the like.

The second optical system 31 arranged in the hollow portion 3A of the second member 3 is arranged between the reflecting member 32 and the first member 2, and includes at least one lens.

The lens 34 arranged in the hollow portion 3A of the second member 3 is arranged at an end portion so as to cover the aperture 3c formed at the end portion opposite to the aperture 3a side of the second member 3. The lens 34 is arranged in the proceeding direction of the light reflected by the reflecting member 32, and the light emitted from the lens 34 is projected onto the projection surface.

The third optical system 33 arranged in the hollow portion 3A of the second member 3 is arranged between the lens 34 and the reflecting member 32, and includes at least one lens. The third optical system 33 includes a movable optical member 33a. The optical member 33a is, for example, a focus lens for adjusting the focal position, a zoom lens for adjusting the focal length, a variable stop having a variable transmitted light amount, or the like.

The driving unit 35 is an actuator such as a solenoid or a motor that drives the optical member 33a, and is controlled by a system controller 14 described later.

After passing through the second optical system 31, the light from the main body unit 1 incident on the hollow portion 3A of the second member 3 is reflected by the reflecting member 32 and proceeds to the direction X2, and then passes through the third optical system 33 and is projected from the lens 34 toward the projection surface.

Four fixed body side contact points (electrodes) E1, E2, E3, and E4 are formed in a contact portion of the first member 2 with the second member 3. Each of the fixed body side contact points E1, E2, E3, and E4 is electrically connected to the system controller 14 described later via wiring (not shown).

Two movable body side contact points (electrodes) N1 and N2 are formed in the contact portion of the second member 3 with the first member 2. The movable body side contact point N1 is electrically connected to a power supply terminal on a plus side of the driving unit 35 via a wiring (not shown). The movable body side contact point N2 is electrically connected to the power supply terminal on a minus side of the driving unit 35 via a wiring (not shown).

Figure 4:
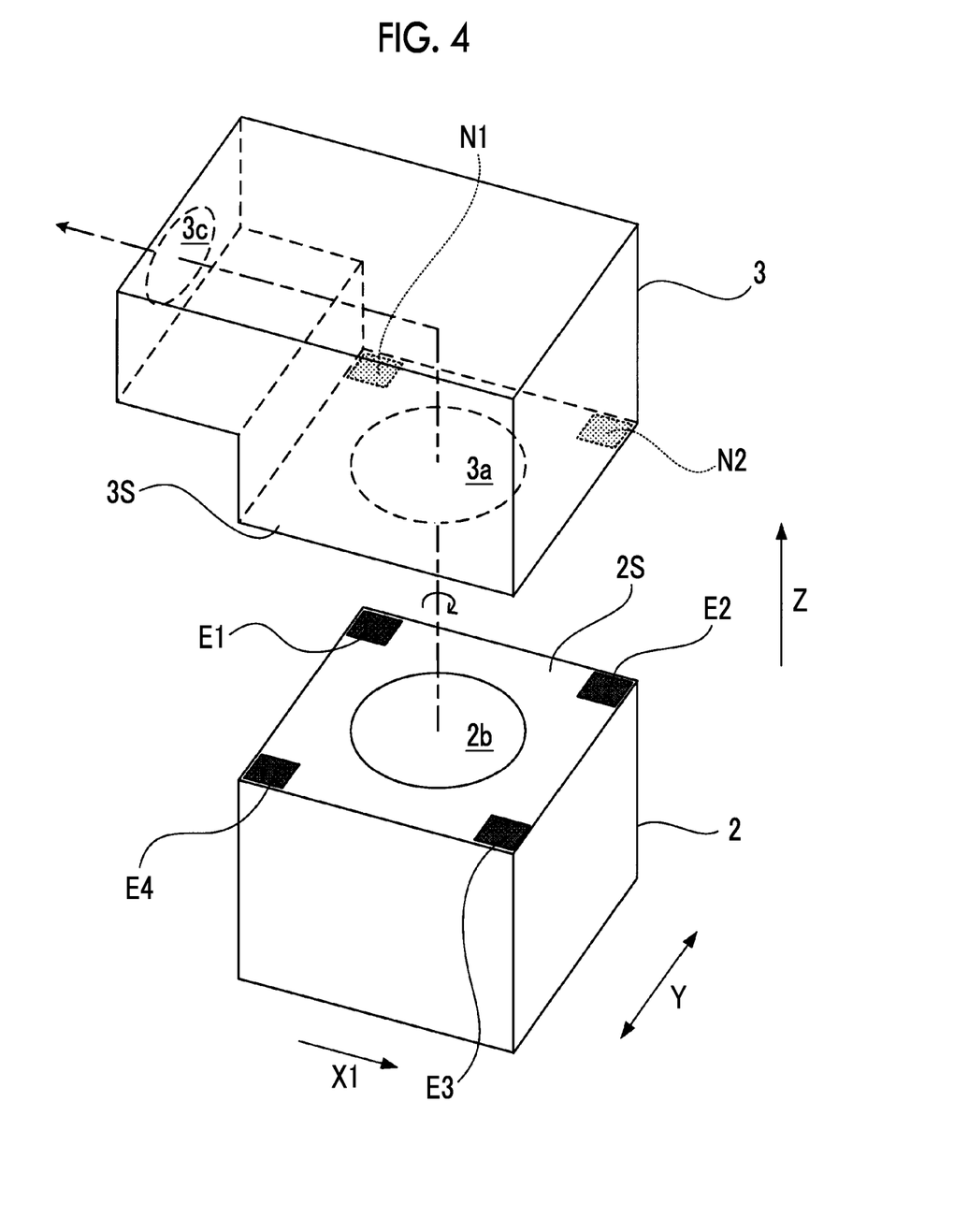
FIG. 4 is a schematic view for explaining detailed positions of a contact point in the optical unit 6 of the projector 100 shown in FIG. 1.

FIG. 4 is a schematic view for explaining detailed positions of a contact point in the optical unit 6 of the projector 100 shown in FIG. 1. As shown in FIG. 4, the first member 2 has a surface 2S perpendicular to the rotation axis (axis extending in the direction Z) of the rotation mechanism 4 as a portion in contact with the second member 3. In the surface 2S, the four fixed body side contact points E1, E2, E3, and E4 are disposed in a square grid shape in the direction Y perpendicular to the direction X1 and the direction Z and the direction X1. The direction X1 constitutes the first direction and the direction Y constitutes the second direction.

In addition, the second member 3 has a surface 3S perpendicular to the rotation axis of the rotation mechanism 4 as a portion in contact with the first member 2. In the surface 3S, the two movable body side contact points N1 and N2 are disposed in the direction X1. An arrangement interval between the movable body side contact point N1 and the movable body side contact point N2 is the same as an arrangement interval between the fixed body side contact point E1 and the fixed body side contact point E2, an arrangement interval between the fixed body side contact point E2 and the fixed body side contact point E3, an arrangement interval between the fixed body side contact point E3 and the fixed body side contact point E4, and an arrangement interval between the fixed body side contact point E4 and the fixed body side contact point E1.

The movable body side contact points N1 and N2 formed on the second member 3 come into contact with two adjacent contact points among the fixed body side contact points E1, E2, E3, and E4 according to the rotational position of the second member 3 with respect to the first member 2 as follows.

At the rotational position (the rotational position shown in FIG. 3) of the second member 3 where the optical axis direction of the lens 34 and the direction X1 are parallel to each other, the movable body side contact point N1 and the fixed body side contact point E1 come into contact with each other, and the movable body side contact point N2 and the fixed body side contact point E2 come into contact with each other in a first contact state. The rotational position of the second member 3 in a case where the first contact state is reached is also referred to as a reference position.

From the state shown in FIG. 3, in a rotational position where the second member 3 is rotated by 90 degree clockwise (back side of the paper surface), the movable body side contact point N1 and the fixed body side contact point E2 come into contact with each other, and the movable body side contact point N2 and the fixed body side contact point E3 come into contact with each other in a second contact state. The rotational position of the second member 3 in a case where the second contact state is reached is also referred to as a rotational position by 90 degree clockwise.

From the state shown in FIG. 3, in a rotational position where the second member 3 is rotated by 180 degree, the movable body side contact point N1 and the fixed body side contact point E3 come into contact with each other, and the movable body side contact point N2 and the fixed body side contact point E4 come into contact with each other in a third contact state. The rotational position of the second member 3 in a case where the third contact state is reached is also referred to as a rotational position by 180 degree.

From the state shown in FIG. 3, in a rotational position where the second member 3 is rotated by 90 degree counterclockwise (front side of the paper surface), the movable body side contact point N1 and the fixed body side contact point E4 come into contact with each other, and the movable body side contact point N2 and the fixed body side contact point E1 come into contact with each other in a fourth contact state. The rotational position of the second member 3 in a case where the fourth contact state is reached is also referred to as a rotational position by 90 degree counterclockwise.

In the optical unit 6, the second member 3 is rotatably configured with respect to the first member 2. Therefore, in a case where the second member 3 is at a rotational position shown in FIG. 3, the projection direction of the light projected from the lens 34 is the opposite direction of the direction X1. In addition, in a case where the second member 3 is at the position rotated by 90 degrees with respect to the state shown in FIG. 3, the projection direction of the light projected from the lens 34 is a direction Y (front or back of the paper surface of FIG. 3) perpendicular to the direction X1 and the direction Z. Further, in a case where the second member 3 is at the position rotated by 180 degree with respect to the state of FIG. 3, for example, the projection direction of the light projected from the lens 34 is the same as the direction X1.

In this way, the projector 100 can change the projection direction of light to a plurality of directions (four directions in the above example) by rotating the second member 3 by the rotation mechanism 4.

In the projector 100, the first member 2 and the main body unit 1 constitutes a fixed body, and the second member 3 constitutes a movable body rotatably configured with respect to the fixed body.

Figure 5:
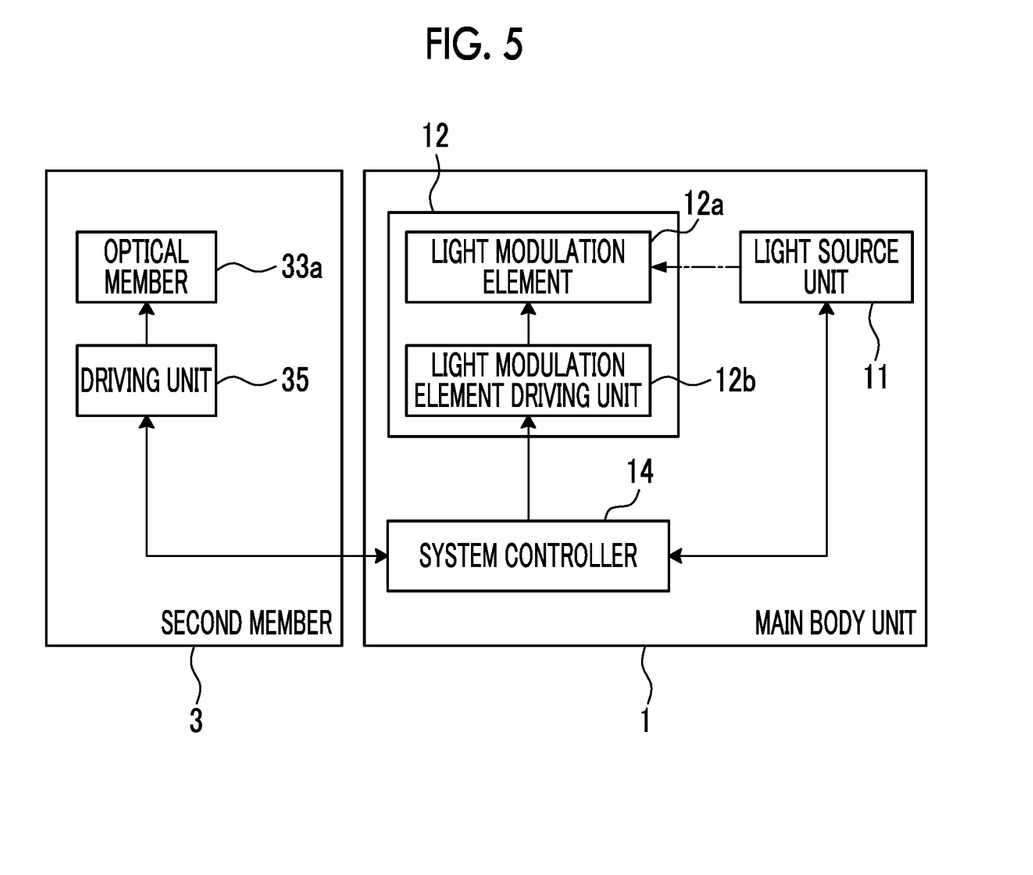
FIG. 5 is a view showing an internal block configuration of the projector 100 shown in FIG. 1.

FIG. 5 is a view showing an internal block configuration of the projector 100 shown in FIG. 1. The main body unit 1 of the projector 100 is provided with the light source unit 11, the light modulation unit 12 including a light modulation element 12a and a light modulation element driving unit 12b for driving the light modulation element 12a, and the system controller 14 for overall control the entire system.

The light modulation element driving unit 12b drives the light modulation element 12a on the basis of the image data input from the system controller 14, and spatially modulates the light from the light source unit 11 by the image data.

The system controller 14 comprises various processors, a read only memory (ROM), and a random access memory (RAM).

Examples of the various processors include a central processing unit (CPU) which is a general-purpose processor for executing a program and performing various processes, a programmable logic device (PLD) which is a processor capable of changing a circuit configuration after the manufacture such as a field programmable gate array (FPGA), or a dedicated electric circuit which is a processor having a circuit configuration specifically designed for executing a specific process such as an application specific integrated circuit (ASIC).

The structure of these various processors is, more specifically, an electric circuit in which circuit elements such as semiconductor elements are combined.

The processor of the system controller 14 may be configured by one of various processors, or may be a combination of two or more processors of the same type or different types (for example, a combination of a plurality of FPGAs or a combination of CPU and FPGA).

The system controller 14 is electrically connected to the driving unit 35 contained in the second member 3 in a case where the contact state between the movable body side contact points N1 and N2 and the fixed body side contact points E1 to E4 is any of the first contact state, the second contact state, the third contact state, and the fourth contact state.

Figure 6:
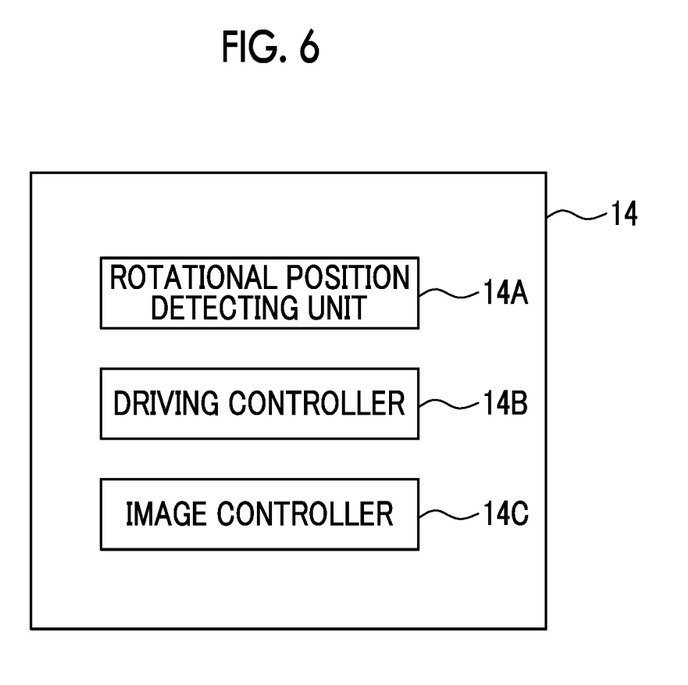
FIG. 6 is a functional block view of a system controller 14 shown in FIG. 5.

FIG. 6 is a functional block view of a system controller 14 shown in FIG. 5. The processor of the system controller 14 functions as a rotational position detecting unit 14A, a driving controller 14B, and an image controller 14C by executing an application program including a control program.

The rotational position detecting unit 14A detects the rotational position of the second member 3 on the basis of the positions of the fixed body side contact points E1 to E4 that are in contact with the movable body side contact points N1 and N2.

The rotational position detecting unit 14A monitors the potential of each of the fixed body side contact points E1 to E4, for example, to detect which of the fixed body side contact points E1 to E4 is in contact with the movable body side contact points N1 and N2. In a case where the rotational position detecting unit 14A detects that the fixed body side contact points E1 and E2 are in contact with the movable body side contact points N1 and N2, it is detected that the rotational position of the second member 3 is the reference position.

In a case where the rotational position detecting unit 14A detects that the fixed body side contact points E2 and E3 are in contact with the movable body side contact points N1 and N2, it is detected that the rotational position of the second member 3 is the rotational position by 90 degree clockwise.

In a case where the rotational position detecting unit 14A detects that the fixed body side contact points E3 and E4 are in contact with the movable body side contact points N1 and N2, it is detected that the rotational position of the second member 3 is the rotational position by 180 degree.

In a case where the rotational position detecting unit 14A detects that the fixed body side contact points E4 and E1 are in contact with the movable body side contact points N1 and N2, it is detected that the rotational position of the second member 3 is the rotational position by 90 degree counterclockwise.

The driving controller 14B controls the driving unit 35 by electrically conducting the fixed body side contact points that are in contact with the movable body side contact points N1 and N2. As described above, the movable body side contact point N1 is connected to the power supply terminal on the plus side of the driving unit 35. In addition, the movable body side contact point N2 is connected to the power supply terminal on the minus side of the driving unit 35.

Therefore, in a case where the rotational position detecting unit 14A detects that the rotational position is the reference position, the driving controller 14B electrically conducts the fixed body side contact points E1 and E2 such that the potential of the fixed body side contact point E1 in contact with the movable body side contact point N1 is the plus side and the potential of the fixed body side contact point E2 in contact with the movable body side contact point N2 is the minus side.

In addition, in a case where the rotational position detecting unit 14A detects that the rotational position is the rotational position by 90 degree clockwise, the driving controller 14B electrically conducts the fixed body side contact points E2 and E3 such that the potential of the fixed body side contact point E2 in contact with the movable body side contact point N1 is the plus side and the potential of the fixed body side contact point E3 in contact with the movable body side contact point N2 is the minus side.

In addition, in a case where the rotational position detecting unit 14A detects that the rotational position is the rotational position by 180 degree, the driving controller 14B electrically conducts the fixed body side contact points E3 and E4 such that the potential of the fixed body side contact point E3 in contact with the movable body side contact point N1 is the plus side and the potential of the fixed body side contact point E4 in contact with the movable body side contact point N2 is the minus side.

In addition, in a case where the rotational position detecting unit 14A detects that the rotational position is the rotational position by 90 degree counterclockwise, the driving controller 14B electrically conducts the fixed body side contact points E4 and E1 such that the potential of the fixed body side contact point E4 in contact with the movable body side contact point N1 is the plus side and the potential of the fixed body side contact point E1 in contact with the movable body side contact point N2 is the minus side.

By the electrical conduction control, even in a case where the rotational position of the second member 3 is any of the reference position, the rotational position by 90 degree clockwise, the rotational position by 180 degree, and the rotational position by 90 degree counterclockwise, the system controller 14 electrically conducts the driving unit 35, and the optical member 33a can be driven by the driving unit 35.

The image controller 14C changes the image projected from the lens 34 onto the projection surface by changing the image data input to the light modulation element driving unit 12b. The image controller 14C changes the orientation of the image data input to the light modulation element driving unit 12b on the basis of the rotational position of the second member 3 detected by the rotational position detecting unit 14A.

Specifically, the image controller 14C controls the image data to be input to the light modulation element driving unit 12b such that the upper end of the image projected onto the projection surface is positioned on the upper side in the vertical direction and the lower end of the image projected onto the projection surface is positioned on the lower side in the vertical direction (in other words, the top and bottom of the image and the top and bottom of the projection surface coincide), even in a case where the rotational position of the second member 3 is any of the reference position, the rotational position by 90 degree counterclockwise, the rotational position by 180 degree, or the rotational position by 90 degree clockwise.

For example, in the image controller 14C, assuming that the rotational position of the second member 3 is at the rotational position by 90 degree clockwise, the orientation of image data input to the light modulation element driving unit 12b is rotated by 90 degree clockwise with respect to a reference in a case where the rotational position of the second member 3 is at the reference position and the orientation of the image data input to the light modulation element driving unit 12b is used as a reference.

In the image controller 14C, in a case where the rotational position of the second member 3 is the rotational position of 180 degrees, the orientation of image data input to the light modulation element driving unit 12b is rotated by 180 degree with respect to a reference.

In the image controller 14C, in a case where the rotational position of the second member 3 is the rotational position by 90 degree counterclockwise, the orientation of image data input to the light modulation element driving unit 12b is rotated by 90 degree counterclockwise with respect to a reference.

As described above, according to the projector 100, even in a case where the rotational position of the second member 3 is any of the reference position, the rotational position by 90 degree clockwise, the rotational position by 180 degree, and the rotational position by 90 degree counterclockwise, the top and bottom of the image can coincide with the top and bottom of the projection surface, and the change of the projection image due to the change of the projection direction can be eliminated.

In addition, according to the projector 100, the rotational position of the second member 3 is detected by using the movable body side contact points N1 and N2 and the fixed body side contact points E1 to E4 for the electrical conduction the driving unit 35. Therefore, a dedicated sensor for detecting the rotational position becomes unnecessary, and the manufacturing cost can be reduced.

In addition, according to the projector 100, the driving unit 35 and the system controller 14 are electrically connected by the movable body side contact points N1 and N2 and the fixed body side contact points E1 to E4. Therefore, even in a case where the second member 3 is frequently rotated, there is no concern that the driving unit 35 and the system controller 14 cannot be electrically connected, and the reliability can be improved. Further, as compared with the configuration in which the driving unit 35 and the system controller 14 are electrically connected by using wiring, the structure can be simplified and the manufacturing cost can be reduced.

Next, a modification example of the projector 100 will be described.

First Modification Example

The system controller 14 preferably controls to stop the projection of light onto the projection surface in a case where at least one movable body side contact point is not in contact with any of the fixed body side contact points E1 to E4.

When the second member 3 is rotating and the rotational position of the second member 3 is neither the reference position, the rotational position by 90 degree clockwise, the rotational position by 180 degree, or the rotational position by 90 degree counterclockwise, the movable body side contact points N1 and N2 and the fixed body side contact points E1 to E4 are not in contact with each other. In this state, the system controller 14 stops the projection of light onto the projection surface by performing, for example, a process of stopping the input of image data to the light modulation element driving unit 12b, a process of stopping the light source unit 11, or both of these processes. As a result, it is not necessary to show the user the state in which the orientation of the projection image changes during the rotation of the second member 3, so that usability can be improved.

Second Modification Example

Figure 7:
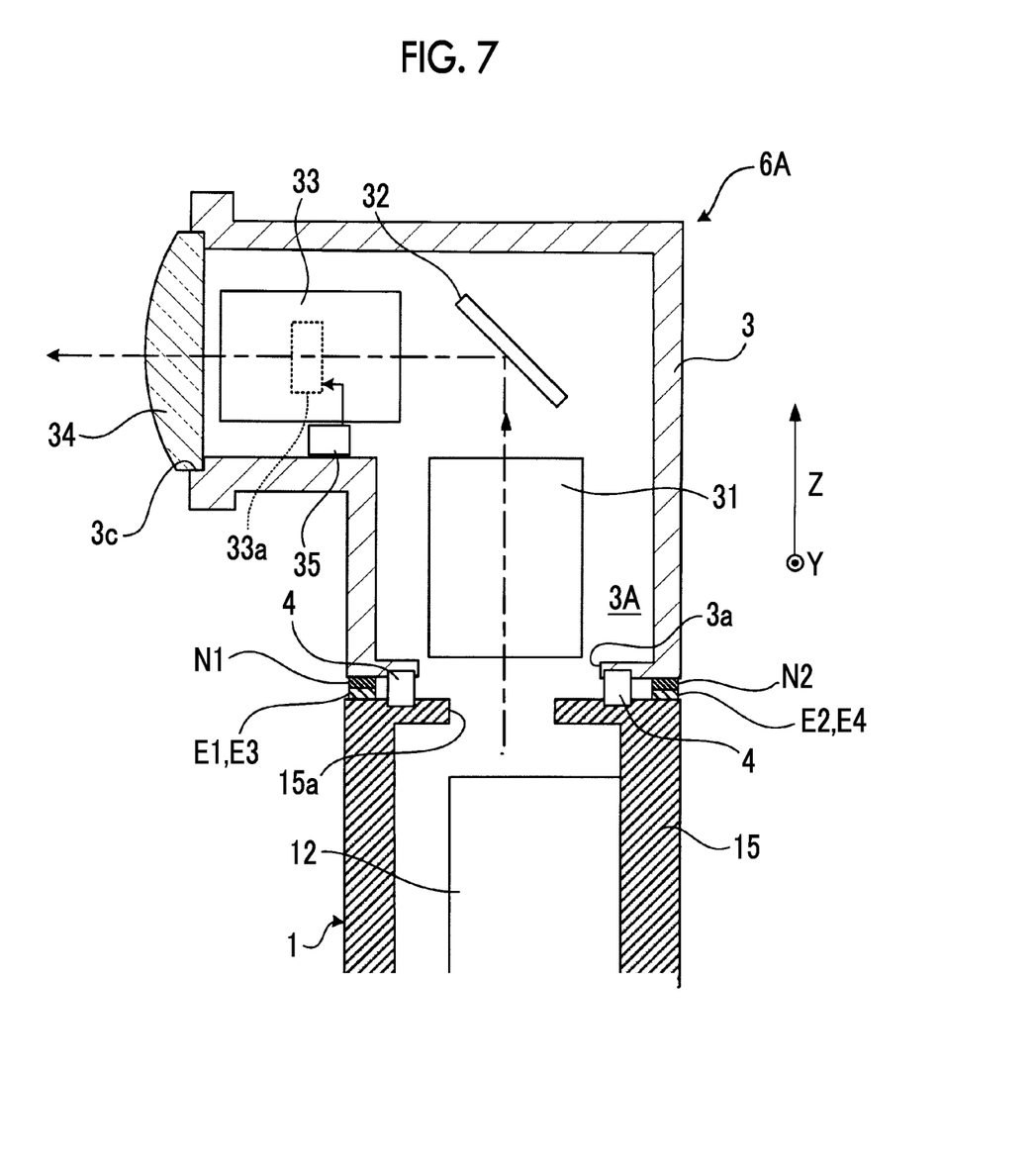
FIG. 7 is a schematic cross-sectional view of an optical unit 6A, which is a modification example of the optical unit 6.
Figure 8:
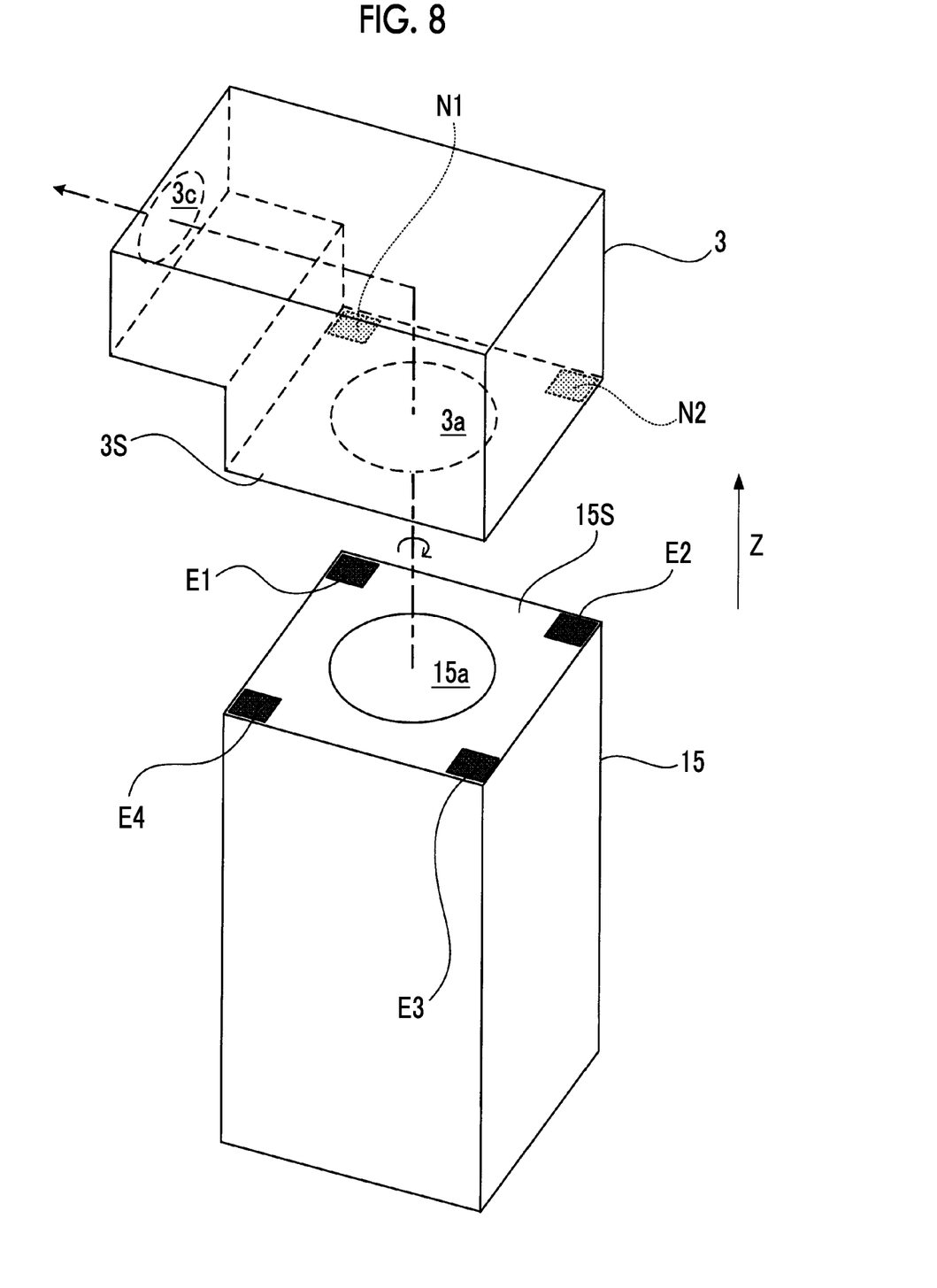
FIG. 8 is an exploded perspective schematic view of the optical unit 6A shown in FIG. 7.

FIG. 7 is a schematic cross-sectional view of an optical unit 6A, which is a modification example of the optical unit 6. FIG. 8 is an exploded perspective schematic view of the optical unit 6A shown in FIG. 7.

The optical unit 6A shown in FIG. 7 has the same configuration as that of the optical unit 6 except that the first member 2 is removed, the second member 3 is rotatably connected to the main body unit 1 by the rotation mechanism 4, and the fixed body side contact points E1 to E4 are provided on a surface 15S of the main body unit 1 in the housing 15 in contact with the second member 3.

The second member 3 of the optical unit 6A is rotatably configured by the rotation mechanism 4 around a rotation axis parallel to the direction Z, which is the incidence direction of the light incident from the main body unit 1. That is, the optical unit 6A has a configuration in which the projection direction can be changed to a plurality of directions by rotating the entire unit.

The projector 100 having the optical unit 6A is installed and used in a posture in which the direction Z is opposite to the vertical direction. The operation of the system controller 14 of the projector 100 of the second modification example is the same as the operation of the system controller 14 of the projector 100 of the embodiment, except that the state shown in FIG. 7 is the reference position of the second member 3.

In the optical unit 6A, the direction Z is the incidence direction of the light incident on the reflecting member 32, the main body unit 1 constitutes a fixed body, and the second member 3 constitutes a movable body. According to the projector 100 having the optical unit 6A, even in a case where the rotation of the second member 3 for changing the projection direction is repeated, the electrical connection between the second member 3 and the main body unit 1 can be maintained, and the rotational position of the second member 3 can be detected and the projection image can be adjusted according to the projection direction without adding a dedicated sensor.

Third Modification Example

The projector 100 shown in FIG. 1 is installed such that the direction Z is opposite to the vertical direction and is used, but it may be installed such that the direction Z is directed to the vertical direction and can be used, for example, hung from the ceiling. In this case, a posture sensor for detecting an installation posture of the projector 100 is provided on the main body unit 1 or the first member 2.

In the projector 100 of the third modification example, the image controller 14C performs the control described above (in a case where the rotational position of the second member 3 is the reference position, the orientation of the image data is used as a reference, in a case where the rotational position is the rotational position by 90 degree clockwise, the orientation of the image data is rotated by 90 degree clockwise with respect to a reference, in a case where the rotational position is the rotational position by 180 degree, the orientation of the image data is rotated by 180 degree with respect to a reference, and in a case where the rotational position is the rotational position by 90 degree counterclockwise, the orientation of the image data is rotated by 90 degree counterclockwise with respect to a reference) in a case where it detects that the direction Z is an installation posture facing the opposite direction of the vertical direction from the detection information of the posture sensor described above.

On the other hand, assuming that it is detected from the detection information of the posture sensor that the direction Z is the installation posture facing the vertical direction, in a case where the rotational position of the second member 3 is the reference position, the image controller 14C controls to rotate the orientation of the image data by 180 degree with respect to the reference, in a case where the rotational position is the rotational position by 90 degree clockwise, the image controller 14C controls to rotate the orientation of the image data by 90 degree counterclockwise with respect to the reference, in a case where the rotational position is the rotational position by 180 degree, the image controller 14C sets the orientation of the image data as the reference orientation, and in a case where the rotational position is the rotational position by 90 degree counterclockwise, the image controller 14C controls to rotate the orientation of the image data by 90 degree clockwise with respect to the orientation.

In this way, by changing the orientation of the image data according to the installation posture of the projector 100, the top and bottom of the image and the top and bottom of the projection surface can always coincide regardless of the installation posture.

Other Modification Examples

The number of movable body side contact points provided on the second member 3 is two, but may be three or more. In addition, the number of fixed body side contact points provided on the first member 2 or the main body unit 1 is four, but may be five or more.

Although various embodiments have been described above with reference to the drawings, it goes without saying that the present invention is not limited to such examples. It is obvious to those skilled in the art that various change examples or correction examples can be conceived within the scope described in the claims, and naturally, these also belong to the technical scope of the present invention. In addition, the constituent elements in the above-described embodiments may be randomly combined without departing from the spirit of the invention.

It should be noted that this application is on the basis of JP2018-139788 filed on Jul. 25, 2018, the contents of which are incorporated herein by reference.

According to the present invention, it is possible to provide a projection apparatus capable of maintaining the electrical connection with a movable body even in a case where the movable body is rotated repeatedly to change the projection direction, and capable of detecting the rotational position of the movable body and adjusting the projection image according to the projection direction without adding a dedicated sensor.

EXPLANATION OF REFERENCES

100: projector
1: main body unit
2: First member
2S: surface
2a, 2b: aperture
2A: hollow portion
21: first optical system
22: reflecting member
3: second member
3S: surface
3a, 2b: aperture
3A: hollow portion
31: second optical system
32: reflecting member
33: third optical system
34: lens
4: rotation mechanism
6, 6A: optical unit
11: light source unit
41: light source
42: color wheel
43: illumination optical system
12: light modulation unit
12a: light modulation element
12b: light modulation element driving unit
14: system controller
14A: rotational position detecting unit
14B: driving controller
14C: image controller
15: housing
15S: surface
15a: aperture
35: driving unit
33a: optical member
N1, N2: movable body side contact point
E1 to E4: fixed body side contact point

What is claimed is:

1. A projection apparatus comprising:
   a fixed body that contains a light source and a light modulation element for spatially modulating light from the light source based on image data;
   a movable body that includes a reflecting member for reflecting light emitted from the fixed body, is rotatably supported by the fixed body around a rotation axis parallel to an incidence direction of the light onto the reflecting member, and is movable with respect to the fixed body;
   a fixed body side electrode that is formed in a portion, in contact with the movable body, of the fixed body;
   a movable body side electrode that is formed in a portion, in contact with the fixed body, of the movable body;

a driving unit that is provided at the movable body and electrically connected to the movable body side electrode; and an optical member that is provided at the movable body and driven by the driving unit, wherein the fixed body includes a driving controller that controls the driving unit in a case where the movable body side electrode is electrically conducted with the fixed body side electrode.

2. The projection apparatus according to claim 1, wherein the driving controller controls a direction of a current that electrically conducts the fixed body side electrode in contact with the movable body side electrode.

3. The projection apparatus according to claim 1, wherein projection of light onto a projection surface is stopped in a state in which at least one of the movable body side electrode is not in contact with the fixed body side electrode.

4. The projection apparatus according to claim 2, wherein projection of light onto a projection surface is stopped in a state in which at least one of the movable body side electrode is not in contact with the fixed body side electrode.

5. The projection apparatus according to claim 1, wherein number of the movable body side electrode is smaller than number of the fixed body side electrode.

6. The projection apparatus according to claim 2, wherein number of the movable body side electrode is smaller than number of the fixed body side electrode.

7. The projection apparatus according to claim 3, wherein number of the movable body side electrode is smaller than number of the fixed body side electrode.

8. The projection apparatus according to claim 4, wherein number of the movable body side electrode is smaller than number of the fixed body side electrode.

9. The projection apparatus according to claim 1, wherein
the fixed body side electrode is disposed on a surface perpendicular to the rotation axis in a square grid shape in a first direction and a second direction orthogonal to the first direction, and
the movable body side electrode is disposed on the surface in the first direction with a same interval as an arrangement interval of the fixed body side electrode in the first direction.

10. The projection apparatus according to claim 2, wherein
the fixed body side electrode is disposed on a surface perpendicular to the rotation axis in a square grid shape in a first direction and a second direction orthogonal to the first direction, and
the movable body side electrode is disposed on the surface in the first direction with a same interval as an arrangement interval of the fixed body side electrode in the first direction.

11. The projection apparatus according to claim 3, wherein
the fixed body side electrode is disposed on a surface perpendicular to the rotation axis in a square grid shape in a first direction and a second direction orthogonal to the first direction, and
the movable body side electrode is disposed on the surface in the first direction with a same interval as an arrangement interval of the fixed body side electrode in the first direction.

12. The projection apparatus according to claim 4, wherein
the fixed body side electrode is disposed on a surface perpendicular to the rotation axis in a square grid shape in a first direction and a second direction orthogonal to the first direction, and
the movable body side electrode is disposed on the surface in the first direction with a same interval as an arrangement interval of the fixed body side electrode in the first direction.

13. The projection apparatus according to claim 1, further comprising:
a rotational position detecting unit that detects a rotational position of the movable body based on a position of the fixed body side electrode in contact with the movable body side electrode.

14. The projection apparatus according to claim 2, further comprising:
a rotational position detecting unit that detects a rotational position of the movable body based on a position of the fixed body side electrode in contact with the movable body side electrode.

15. The projection apparatus according to claim 3, further comprising:
a rotational position detecting unit that detects a rotational position of the movable body based on a position of the fixed body side electrode in contact with the movable body side electrode.

16. The projection apparatus according to claim 4, further comprising:
a rotational position detecting unit that detects a rotational position of the movable body based on a position of the fixed body side electrode in contact with the movable body side electrode.

17. The projection apparatus according to claim 1, further comprising:
an image controller that changes an orientation of the image data based on a rotational position of the movable body.

18. The projection apparatus according to claim 2, further comprising:
an image controller that changes an orientation of the image data based on a rotational position of the movable body.

19. The projection apparatus according to claim 1, wherein
the optical member is a lens for focus adjustment, a lens for focal length adjustment, or a variable stop.

20. The projection apparatus according to claim 1, wherein
the driving unit is an actuator.

* * * * *